R. S. TROGNER.
METHOD OF BUILDING TIRES.
APPLICATION FILED JULY 29, 1918.
1,374,408.
Patented Apr. 12, 1921.
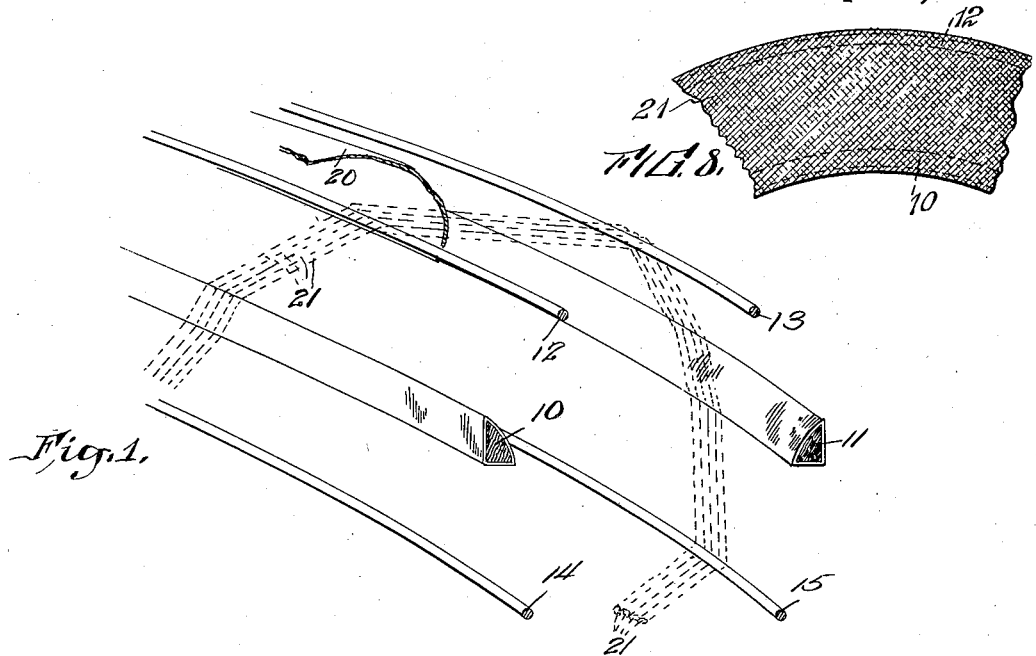
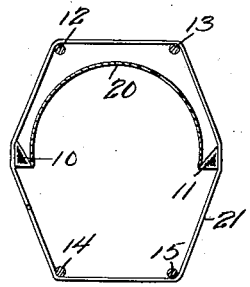
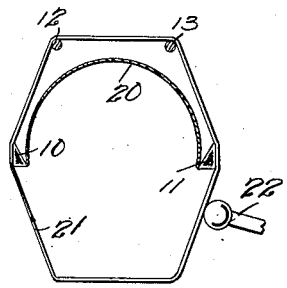
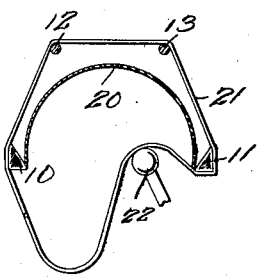
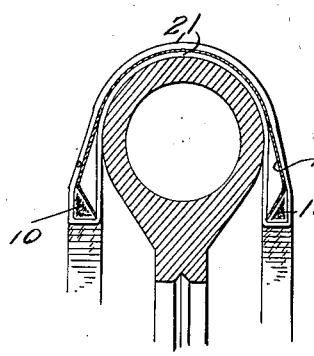
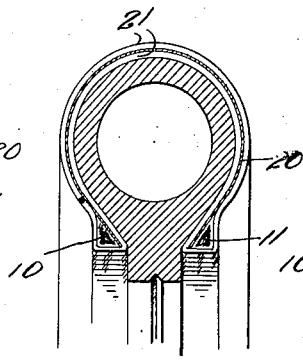
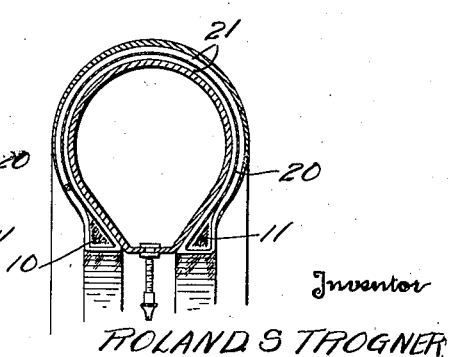
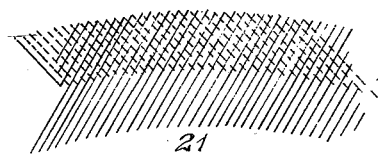
Inventor
ROLAND S TROGNER,
By
his Attorney.

UNITED STATES PATENT OFFICE.

ROLAND S. TROGNER, OF AKRON, OHIO, ASSIGNOR TO THE GOODYEAR TIRE & RUBBER COMPANY, OF AKRON, OHIO, A CORPORATION OF OHIO.

METHOD OF BUILDING TIRES.

1,374,408.   Specification of Letters Patent.   Patented Apr. 12, 1921.

Application filed July 29, 1918. Serial No. 247,208.

*To all whom it may concern:*

Be it known that I, ROLAND S. TROGNER, a citizen of the United States, and resident of Akron, Summit county, Ohio, have invented new and useful Improvements in Methods of Building Tires, of which the following is a specification.

My present invention relates to improvements in the art of building tires and more particularly to a method of constructing pneumatic tires of the two ply blanket type. Various methods of procedure have been followed in constructing tires of this type, the most common one being the weaving of the blanket upon a core or forming ring by machinery. This method necessitated the incorporation of a series of metal hooks or pins into the bead structure thereby adding additional weight and cost to the manufacture.

It is the principal object of the present invention to build tire carcasses of the two ply blanket type producing a tire carcass which consists only of the necessary parts, namely, beads and the cord blanket. Another object is to provide a method wherein the building up of the blanket upon the core or mandrel is easily and quickly accomplished without the aid of extensive and expensive machinery. A still further object is to provide a method that will produce a two ply blanket type carcass that may immediately receive a suitable air bag or sectional core for the purpose of receiving its initial cure.

The above and additional objects of a similar nature, which will be hereinafter more specifically treated, may be accomplished by such means as are illustrated in the accompanying drawings, described in the following specification, and then more particularly pointed out in the claims which are appended hereto and form a part of this application.

With reference to the drawings, wherein there has been illustrated a preferred embodiment of the invention as it is reduced to practice and throughout the several views of which, similar reference numbers designate corresponding parts:

Figure 1 represents a diagrammatic perspective view of my proposed apparatus;

Figs. 2, 3, 4, 5 and 6 illustrate diagrammatic views representing the various steps in the construction of my improved carcass;

Fig. 7 represents a sectional view showing my improved cord blanket positioned over an air bag.

Fig. 8 is a fragmentary side elevational view of a structure formed through the practice of my invention, and illustrating in full and dotted lines the respective angles at which the cords will lie in the finished structure.

Fig. 9 is a similar view illustrating diagrammatically the manner of folding the cords of the inner portion of the structure within the latter portion thereof.

The ideal two ply blanket cord tire consists of two plies of the so-called cable cords which are firmly fastened or secured in any suitable manner to the beads, thereby causing the beads to be the anchoring posts for the independent blankets and also wherein the angle of the two plies will be at 90 degrees to each other. Standard tire construction requires that the angle of the cords of the independent plies be at approximately 45 degrees to the main axis of the tire, *i. e.*, circumferential axis. All tires should have each of its fabric elements (cords or threads) so positioned that each independent element will take up its proportionate share of the stresses and strains. To do this, each cord must be entirely isolated or insulated from its companion cords in such a manner that the amount of friction and tension will be absolutely equal or eliminated as the case may be.

In the drawings I have illustrated in a conventional way the necessary forming wires, etc., required in building up the cord blanket and have not attempted to show any means or method of holding the forming wires, etc., during the various operations.

The construction of the so-called straight side or piano wire beads used in tires of this type is such that the only movement they may have is in a lateral direction. I propose, therefore, to place the beads 10 and 11 in parallel planes having their axes in alinement and spaced apart sufficiently to permit the insertion of a sectional core or air bag at a later period as will be later described. These rings may be held in this spaced relation by any suitable apparatus (not shown).

A thin strip of gum 20 is then fastened at each edge to the beads and extends completely around the circumference thereof in a manner clearly shown in the drawings. This is to provide a layer of gum between the two plies of cords after they are correctly positioned as will be later described.

Numerals 12, 13, 14 and 15 designate sectional split rings positioned in pairs above and below or on opposite sides of the before mentioned beads in such relation that a line drawn around these rings and the beads will be equal to twice the distance from a point along the medial line of the core down around the outer surface, around the bead, up and over the outer circumference of the core, around the bead on the opposite side and up to the beginning point.

Assuming that these four split rings and the beads are correctly positioned, the next step consists in wrapping one or more cords, designated as 21, completely around the hexagon formed by the said rings and beads at an angle of approximately 45 degrees to the circumference of the beads. This is continued around the forms until a complete covering is produced. It will be readily understood that in case only one cord is wound at a time, a greater number of laps around the form will be necessary whereas if a plurality of cords as a unit are wound, a lesser number of laps will be required.

Fig. 2 illustrates an end sectional view of the forms covered with their cord wrappings and in a position just prior to the removal of the split rings 14 and 15 to be next described. At this point, the cord wrappings will be separated at a point over the junction of the split rings and the rings removed by withdrawing them through the separated cords.

Fig. 3 illustrates the position of the blanket just after the removal of the split rings 14 and 15 and prior to the doubling of the lower portion of the blanket inside of the upper portion. A diagrammatic showing of how this is done is illustrated in Fig. 4 wherein a former or tool 22 of suitable design is revolved and slowly expanded to take care of the increase in diameter and at the same time push the lower portion of the blanket into the upper portion as will be readily apparent.

Fig. 5 illustrates the next step wherein the sectional mandrel has been inserted and just prior to the expansion movement or stretching of the blanket and the removal of the top rings 12 and 13. These rings are removed in a similar manner to that of the removal of the rings 14 and 15. Pressure is then brought to bear by any suitable means upon the sectional core which causes the beads 10 and 11 to move inwardly in a lateral direction thereby assuming the position they will assume in the finished carcass. This position is clearly illustrated in Fig. 6 and illustrates the carcass as being ready to receive the cushion, chafing and other finishing strips.

In Figs. 8 and 9 I have illustrated in dotted lines the approximate position in which the cords of the lower or inner portion of the blanket will lie when they are folded into the upper or outer portion of the cord blankets.

It will be readily understood that in place of the sectional core or mandrel, as shown in Fig. 5, it may be replaced by an air bag and the necessary pressure required for expanding the set of cords to their final position may be obtained by air pressure as may be apparent.

Fig. 7 illustrates the tire in the position just described wherein the blanket is positioned over the air bag and as having the requisite finishing strips applied thereto and ready for the initial cure.

From the foregoing, it will be seen that in adopting a device of the character described, that although there is a single wrapping of cord wound around the formers at an approximate angle of 45 degrees, that upon removal of the lower split rings and the doubling of the lower, or inner, portion of the blanket within the upper or outer portion the angle of the cords of the former portion will be reversed to an opposite angle of 45 degrees or placing them at an angle of 90 degrees. Thus, two layers of cords are formed, one inclosed by the other, the cords of one layer lying at an angle of 90° with respect to the cords of the other layer and all of the cords lying at an angle of 45° relative to the circumferential axis of the tire.

It will be understood that although I have illustrated and described the use of a plurality of sectional rings, other devices may be employed to accomplish the same results without departing from the spirit of the invention and the scope of the appended claims.

What I claim is:

1. The method of fabricating a tire carcass that comprises, superposing a helical winding of cord elements around a pair of spaced apart bead rings to form an annular wrapping therefor, folding the cords of the inner portion of the annulus into the outer portion thereof and in angular relation with respect thereto, and shaping the structure thus formed into its ultimate cross-sectional contour.

2. The method of fabricating a two-ply cord tire carcass, which comprises attaching a strip of rubber material to a pair of bead elements, winding a cord around the bead elements and strip of rubber material in such manner as to dispose the inner half portion of each convolution of the winding in the finished structure at an angle of approximately 90 degrees to the outer half portion of the convolution, pressing the inner half portion of the cord winding against the inner part of the strip of rubber material, and then pressing the inner half portion of the cord winding to expand the strip of rubber material against the outer half of the cord winding.

3. The method of fabricating a tire carcass that comprises, connecting a pair of spaced apart bead rings by a strip of flexible material, superposing a helical winding of cord elements around the bead rings and strip to form an annular wrapping therefor, folding the cords of the inner portion of the annulus into the outer portion thereof and in right angle relation with respect to the cords of the latter portion, and shaping the structure thus formed into its ultimate cross-sectional contour.

4. The method of fabricating a tire carcass that comprises, connecting a pair of spaced apart bead rings by a strip of flexible material, superposing a helical winding of cord elements around the bead rings and strip to form an annular wrapping of hexagonal cross section for the cords, folding the cords of the inner portion of the annulus into the outer portion of the annulus and in angle relation with respect to the cords of the latter portion, and shaping the structure thus formed into its ultimate cross-sectional contour.

5. The method of fabricating a two-ply cord tire carcass, which comprises attaching a strip of rubber material to a pair of bead elements, winding a cord around the bead elements and strip of rubber material at an approximate angle of 45° with respect to said bead element and then pressing the inner half portion of the cord winding within the outer half portion thereof to connect it to the rubber strip and to expand the rubber strip against the outer half portion of the winding.

6. The method of fabricating a tire carcass that comprises, connecting a pair of spaced apart bead rings by a strip of flexible material, superposing a helical winding of cord elements around the bead rings and strip to form an annular wrapping of hexagonal cross section therefor, folding the cords of the inner half of the annulus into the outer half thereof and in right angle relation with respect to the cords of the latter half, and shaping the structure thus formed into its ultimate cross sectional contour.

7. The method of fabricating a tire carcass that comprises, connecting a pair of spaced apart bead rings by a strip of flexible material, superposing a helical winding of cord elements around the bead rings and strip to form an annular wrapping of hexagonal cross section thereof, folding the cords of the inner half of the annulus into the outer half portion thereof and in right angle relation with respect to the cords of the latter half, and expanding the structure thus formed into its ultimate cross sectional contour.

In witness whereof, I have hereunto signed my name in the presence of two subscribing witnesses.

ROLAND S. TROGNER.

Witnesses:
A. H. LIDDERS,
E. C. LEADENHAM.